UNITED STATES PATENT OFFICE.

GEORGE H. FELT, OF NEW YORK, N. Y., ASSIGNOR TO THE FELT ELECTRICAL COMPANY, OF SAME PLACE.

ELECTRODE FOR GALVANIC BATTERIES.

SPECIFICATION forming part of Letters Patent No. 429,896, dated June 10, 1890.

Application filed November 15, 1889. Serial No. 330,474. (No model.)

*To all whom it may concern:*

Be it known that I, GEORGE H. FELT, of the city, county, and State of New York, have invented a new and useful Improvement in Electrodes for Galvanic Batteries, of which the following is a specification.

The invention which forms the subject of this specification is an electrode for galvanic batteries and the process of making the same. The process may be applied to the making of amalgamated electrodes for either primary or secondary batteries. When designed for primary batteries, the electrode consists of a body of zinc, the surface of which is covered with an amalgam of zinc, aluminium, and mercury. When designed for secondary batteries, the body of the electrode is lead and the amalgam is lead, aluminium, and mercury. The zinc electrode is found in practice to have the advantage of lasting longer without need of reamalgamation than the ordinary amalgamated zinc, and it also adds to the electro-motive force of a battery. The lead electrode has also the quality of increased durability, and it also has an increased capacity for taking up electricity, for which reason batteries of the same capacity can be made lighter by the use of my invention.

In making my improved electrode I take nitro-muriatic acid in about the proportions of one part nitric and two parts muriatic acid and saturate it with quicksilver. To this now practically-inert liquid I add about three parts of muriatic acid to give it life, and I then put into the resultant liquid sulphate of aluminium, as much as will be taken up. Ordinary zincs (of the crow-foot or any other preferred type) or ordinary lead plates, which have been previously pickled in nitrate of mercury, are then set into the liquid, when the process of amalgamation at once begins. In a short time the zincs or lead plates, as the case may be, are removed and ready for use, the surface being coated in the one case with an amalgam of zinc, aluminium, and mercury and in the other with an amalgam of lead, aluminium, and mercury.

The order of the steps in this process is not essential, and the two first saturating processes may be combined in one. I can also secure good results without subjecting the zincs or lead plates to the pickling process referred to.

Having now described my invention, what I claim is—

1. An electrode for galvanic batteries, consisting of a body of metal coated with an amalgam of the same metal, combined with aluminium and mercury, as set forth.

2. An electrode for galvanic batteries, consisting of a body of zinc coated with an amalgam of zinc, mercury, and aluminium, as set forth.

3. The process of coating a metal with an amalgam of the same metal, mercury, and aluminium, which consists in saturating an acid with mercury and sulphate of aluminium, step by step, and then dipping the metal to be coated in the acid thus saturated, as set forth.

4. The process of coating a metal with an amalgam of the same metal, mercury, and aluminium, which consists in saturating nitro-muriatic acid with mercury and sulphate of aluminium, and then submerging the metal to be amalgamated in the acid thus saturated, as set forth.

5. A process of coating a metal with an amalgam of the same metal, mercury, and aluminium, which consists in saturating an acid with mercury and sulphate of aluminium one after the other, submitting the metal to be amalgamated to the action of a separate acid, and then dipping the metal in the saturated acid, as set forth.

6. The process of coating a metal with an amalgam of the same metal, mercury, and aluminium, which consists in saturating an acid with mercury and sulphate of aluminium, and then dipping the metal to be coated in the acid, thus saturating, as set forth.

In testimony whereof I have affixed my signature in presence of two witnesses.

GEORGE H. FELT.

Witnesses:
SIDNEY WARD,
EDWARD W. CODY.

It is hereby certified that in Letters Patent No. 429,896, granted June 10, 1890, upon the application of George H. Felt, of New York, N. Y., for an improvement in "Electrodes for Galvanic Batteries," errors appear in the printed specification requiring the following corrections, viz: In line 91 the comma after the word "acid" should be stricken out and the word "saturating" should read *saturated*; and that the said Letters Patent should be read with these corrections therein that the same may conform to the record of the case in the Patent Office.

Signed, countersigned, and sealed this 24th day of June, A. D. 1890.

[SEAL.]

CYRUS BUSSEY,
*Assistant Secretary of the Interior.*

Countersigned:

C. E. MITCHELL,
*Commissioner of Patents.*